United States Patent [19]

Gudas et al.

[11] Patent Number: 5,156,865
[45] Date of Patent: Oct. 20, 1992

[54] METHOD OF ADDING LICORICE TO CHEWING GUM

[75] Inventors: Victor V. Gudas, Chicago; Lindell C. Richey, Lake Zurich, both of Ill.

[73] Assignee: Wm. Wrigley Jr. Company, Chicago, Ill.

[21] Appl. No.: 746,337

[22] Filed: Aug. 16, 1991

[51] Int. Cl.$^5$ .............................................. A23G 3/30
[52] U.S. Cl. ........................................ 426/3; 426/534
[58] Field of Search ...................................... 426/3-6, 426/548, 658, 534

[56] References Cited

U.S. PATENT DOCUMENTS

| | | | |
|---|---|---|---|
| 98,304 | 12/1869 | Semple | 426/3 |
| 3,282,706 | 11/1966 | Muller et al. | 426/548 |
| 3,851,073 | 11/1974 | Cook | 426/3 |
| 4,159,347 | 6/1979 | Yoshida | 426/3 |
| 4,176,201 | 11/1979 | Cook | 426/548 |
| 4,252,829 | 2/1981 | Terrevazzi | 426/3 |
| 4,277,511 | 7/1981 | Bliznak et al. | 426/548 |
| 4,374,123 | 2/1983 | Luccarelli, Jr. et al. | 424/49 |
| 4,384,005 | 5/1983 | McSweeney | 426/250 |
| 4,726,953 | 2/1988 | Carroll et al. | 426/5 |
| 4,889,726 | 12/1989 | Dave et al. | 426/3 |
| 4,938,971 | 7/1990 | Chapdelaine et al. | 426/3 |

FOREIGN PATENT DOCUMENTS 1261729 1/1972 United Kingdom .

OTHER PUBLICATIONS

Furia et al., Lenaroli's Handbook of Flavor Ingredients, CRC Cleveland Ohio 1971 pp. 152-153.
Winter, R., A Consumer's Dictionary of Food Additives Crown Pub. Inc., N.Y. 1972 pp. 116, 139.
*Encyclopedia Of Food Technology*, Johnson et al., vol. 2 (1974), pp. 550-553.
*Handbook Of Flavor Ingredients*, Fenaroli, vol. 1, Edition 2 (1975), pp. 392-393.
*Encyclopedia Of Common Natural Ingredients Used In Food, Drugs & Cosmetics*, Leung, 1980, pp. 220-223.
"Licorice" brochure, Mac Andrews & Forbes Co., Camden, N.J.

*Primary Examiner*—Jeanette Hunter
*Attorney, Agent, or Firm*—Willian Brinks Olds Hofer Gilson & Lione

[57] ABSTRACT

Licorice-flavored chewing gum has much improved flavor, longer lasting flavor and a smoother, more uniform appearance when the licorice powder is dispersed in a hydrophilic liquid such as glycerin.

10 Claims, No Drawings

METHOD OF ADDING LICORICE TO CHEWING GUM

FIELD OF THE INVENTION

This invention relates to a method for adding licorice to chewing gum which results in enhanced licorice flavor and increased flavor duration, along with improved chewing gum appearance.

BACKGROUND OF THE INVENTION

Licorice-flavored chewing gum has long been known in the United States and is currently popular in Europe. Although synthetic licorice flavors are available, naturally-derived licorice flavors are preferred. The best sources of licorice flavor are licorice extracts from licorice root. Licorice extracts are available in powder form, liquid form or paste/block form. Most commonly, the licorice extracts used in chewing gum are in the form of a spray dried powder. Liquid licorice contains too much water to be desirable for chewing gum, and paste/block licorice is not easy to handle.

Licorice powder has had a tendency to clump or agglomerate during or shortly after its addition to chewing gum compositions. This clumping or agglomeration has prevented or made it more difficult for the licorice to become completely and uniformly dispersed in the chewing gum compositions. This clumping or agglomeration has adversely affected the chewing gum both in terms of physical appearance and flavor. As to physical appearance, the chewing gum has appeared nonuniform and "mottled" in the vicinity of the licorice clumps. As to flavor, the lack of dispersion has resulted in less than optimum flavor duration and flavor impact at any given moment.

Various methods are known in the chewing gum industry for reducing the clumping or agglomeration of licorice powder. One technique is to add licorice early in the addition and mixing process, along with other dry chewing gum ingredients, and allow the licorice to become well mixed before adding moisture-containing chewing gum ingredients. Another technique is to add licorice late in the process, allowing the moisture-containing ingredients to become thoroughly mixed with other dry ingredients before licorice is added.

Methods are also known for enhancing the flavor of licorice in chewing gum. U.S. Pat. No. 4,374,123, issued to Luccarelli, Jr. et al., discloses a technique for enhancing licorice and other flavors by adding 4-methyl-3-cyclohexene-1-carboxylic acid.

There is a need or desire in the chewing gum industry for an effective technique of using licorice powder which does not require significantly altering the addition and mixing process to accomodate the use of licorice, and which does not require the use of additional synthetic ingredients not ordinarily present in the chewing gum.

SUMMARY OF THE INVENTION

Glycerin is a commonly used chewing gum softener which has hydrophilic properties. Typically, glycerin is added to the chewing gum near the middle of the addition and mixing process, after the gum base has been melted and mixed with color and emulsifiers but before the final part of the bulk portion containing sweeteners, flavoring agents and additional softeners has been added.

It has been found that by preblending the licorice powder with glycerin and adding the blend to the gum, the clumping of licorice in the gum can be prevented, resulting in a more uniform appearance of the chewing gum. Furthermore, this method of adding licorice significantly improves the flavor release of the licorice resulting in both increased flavor impact and extended flavor duration.

The licorice powder/glycerin blend can be added to the chewing gum at any stage of the addition and mixing cycle, and can be added with or without other chewing gum ingredients being added at the same time. Alternatively, the licorice and glycerin can be blended together by adding them separately to the chewing gum but at substantially the same time, with the glycerin being added first followed immediately by the licorice, but preferably without other chewing gum ingredients being added at the same time. In this way, the licorice powder can be blended with glycerin before and during mixing with the gum. This alternative technique also has the effects of improving the physical appearance of the gum, and of causing increased flavor impact and extended flavor duration.

With the foregoing in mind, it is a feature and advantage of the invention to provide an improved method of effectively adding and dispersing licorice powder into chewing gum without significantly altering the addition and mixing sequence to accommodate the licorice powder.

It is also a feature and advantage of the invention to provide an improved method of enhancing the flavor of licorice in chewing gum without requiring the use of additional synthetic or other ingredients not ordinarily used in the chewing gum.

It is also a feature and advantage of the invention to provide an improved licorice-flavored chewing gum composition having both enhanced flavor and extended flavor duration.

It is also a feature and advantage of the invention to provide an improved licorice-flavored chewing gum composition which has a smoother, more uniform physical appearance.

The foregoing and other features and advantages will become further apparent from the following detailed description of the presently preferred embodiments of the invention. It should be understood that this description and the accompanying examples are illustrative rather than limitative, with the scope of the invention being defined by the appended claims and equivalents thereof.

DETAILED DESCRIPTION OF THE PRESENTLY PREFERRED EMBODIMENTS

Licorice powder is very hygroscopic and the individual particles tend to clump together or agglomerate, especially in a moist but unsaturated environment. This clumping or agglomeration results in less exposed, active surface area from which flavor can be released. Thus, in addition to creating a nonuniform or "mottled" chewing gum appearance, the agglomerated licorice possesses greatly inhibited flavor release characteristics.

With the present invention, it is contemplated that the licorice powder will become initially dispersed by blending the licorice with a hydrophilic liquid. Once the licorice has been initially dispersed in this manner, the probability is good that the licorice will not significantly recombine as the hydrophilic medium is then blended into the chewing gum. The present invention contemplates that the improved dispersion of licorice in chewing gum results in increased overall active surface area, causing increased flavor impact and duration.

While the invention focuses on the use of glycerin as the hydrophilic liquid, other hydrophilic liquids might alternatively be blended with licorice. Typical hydrophilic liquids used in sugar gum include glycerin, propylene glycol and corn syrups. Typical hydrophilic liquids used in sugarless gum include glycerin, sorbitol solution, and hydrogenated starch hydrolyzate (Lycasin).

The invention contemplates the use of a blend containing between about 5-60 parts by weight licorice powder and between about 95-40 parts by weight glycerin. The preblend should preferably have the consistency of a liquid or fluid paste to facilitate ease of handling and feeding the preblend. If the licorice concentration becomes too high, the preblend becomes too thick and cannot easily be handled. If the licorice concentration is too low, then either there is too much glycerin or too little licorice to make satisfactory gum.

The preferred blend will contain between about 20-50 parts by weight licorice powder and between 80-50 parts by weight glycerin, depending on the level of glycerin required in the chewing gum formula. The foregoing concentrations of licorice relative to glycerin are the same regardless of whether the licorice and glycerin are preblended separately from the gum, or whether they are blended by adding the glycerin to the gum immediately followed by the licorice.

If the licorice and glycerin are preblended, the blend can be added to the gum at any stage of the mixing cycle, with or without other chewing gum ingredients being added at the same time. Preferably, the blend of licorice and glycerin is added at an early stage of the mixing cycle, but after the gum base and the first portion of the bulking agent are added. The blend is added at an early stage in order to facilitate mixing.

If the licorice and glycerin are blended by adding the glycerin to the gum immediately followed by the licorice, the addition can also occur at any stage of the mixing cycle. Preferably, other chewing gum ingredients are not added at the same time, in order to avoid immediate contact with other unblended ingredients. Preferably, the addition of glycerin followed immediately by licorice will occur at an early stage of the mixing cycle, but after the base portion and a first portion of the bulking agent are added. This allows the licorice and glycerin to mix before other ingredients are added.

In addition to one or more flavoring agents, a chewing gum composition generally includes a water soluble bulk portion and a water insoluble chewing gum base portion. The water soluble portion dissipates with a portion of the flavoring agents over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, sytrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5-95% by weight of the chewing gum composition, more typically 10-50% by weight of the chewing gum, and most commonly 20-30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Flavoring agents should generally be present in the chewing gum in an amount within the range of about 0.1-10% by weight of the chewing gum, preferably between about 0.2-5% by weight of the chewing gum, most preferably between about 0.5-3% by weight of the chewing gum. As previously indicated, flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLES 1-3

Three chewing gum samples were prepared using the following sugar free salty licorice formulation:

| Component | % By Weight |
|---|---|
| Gum base | 26.5 |
| Lecithin | 0.2 |
| Sorbitol | 22.21 |
| Xylitol | 34.5 |
| Mannitol | 7.6 |
| Coevaporated Lycasin/glycerin blend | 4.8 |
| Aspartame | 0.18 |
| Licorice powder | 1.5 |
| Ammonium chloride | 0.5 |
| Liquid artificial licorice flavor | 0.51 |
| Glycerin | 1.5 |

The following describes the mixing procedures for these Examples. For each of the Examples, a laboratory size, two quart Sigma blade mixer was used at a temperature of 120° F. and an rpm of 20 for the fast blade and 12 for the slow blade.

For Example 1, the gum base, lecithin and sorbitol were initially blended in the mixer for four minutes. Then, ammonium chloride and licorice powder were added to the mixer, and the mixture was blended for two more minutes. Then, aspartame, glycerin, the coevaporated Lycasin/glycerin blend and mannitol were added to the mixer. The mixture was blended for one more minute. Xylitol was added, and the mixture was blended for one more minute. The liquid artificial licorice flavor was added, and the mixture was blended for five more minutes. After a total of thirteen minutes mixing, the gum was removed from the mixer. The gum was rolled out to a 0.075 inch thickness and cut into sticks.

For Example 2, the same mixing and addition procedures used for Example 1 were repeated except that the glycerin and the licorice powder were preblended using a mechanical stirrer, and added to the gum formulation after the initial four minute mix.

For Example 3, the same mixing and addition procedures used for Example 1 were repeated except that the glycerin and coevaporated Lycasin/glycerin blend were added after the initial four minute mix, and the licorice powder was added immediately thereafter.

In formal sensory descriptive tests, an expert panel of five sensory experts compared the gum of Example 2 with the gum of Example 1. The gum of Example 2 was described as having higher aroma, faster flavor impact, more licorice root taste, deeper flavor, and longer lasting flavor, than the gum of Example 1.

In formal sensory descriptive tests, the same expert panel of five sensory experts compared the gum of Example 3 with the gum of Example 1. The gum of Example 3 was described as having more aroma, deeper licorice character, more licorice root taste, broader peak flavor, and longer lasting flavor, than the gum of Example 1.

EXAMPLES 4-5

Two sugar bubble gum samples were prepared having the following formulation:

| Component | % By Weight |
|---|---|
| Bubble gum base | 21.9 |
| Lecithin | 0.5 |
| Sugar | 54.8 |
| High maltose syrup | 17.0 |
| Licorice powder | 2.0 |
| Glycerin | 2.0 |
| Ammonium chloride | 1.3 |
| Liquid artificial licorice flavor | 0.5 |

For each of the Examples, a laboratory size two-quart Sigma blade mixer was used at a temperature of 120° F. and an rpm of 20 for the fast blade and 12 for the slow blade.

For Example 4, all ingredients were initially added to the mixer except sugar and the artificial licorice flavor, and the mixer was started. Over the first three minutes of mixing, the sugar was added in three equal portions. After another three minutes, the liquid artificial flavor was added and mixed for another five minutes. The total mix time was eleven minutes.

For Example 5, the glycerin and licorice powder were preblended using a mechanical stirrer. The preblend was added to the mixer six minutes into the mix cycle. All other mixing and addition procedures were the same as for Example 4.

The gum samples of Example 4 and 5 were compared by an expert panel consisting of five experts. The panel noted appearance differences between the samples. The gum sample of Example 4 had a mottled, spotted appearance. The gum sample of Example 5, by contrast, had a smooth appearance and consistent color.

The panel also noted sensory differences. The gum sample of Example 5 had a stronger flavor impact, more licorice taste and a longer licorice flavor duration, than the gum sample of Example 4.

While the embodiments of the invention disclosed herein are presently considered to be preferred, various modifications and improvements can be made without departing from the spirit and scope of the invention. The scope of the invention is indicated in the appended claims, and all changes which come within the meaning and range of equivalency of the claims are intended to be embraced therein.

We claim:

1. A method of preparing a chewing gum composition which includes a licorice flavor ingredient, comprising the steps of:

providing quantities of licorice powder and glycerin, in a ratio of about 5-60 parts by weight licorice powder to about 95-40 parts by weight glycerin;

adding a chewing gum base to a running mixer in an amount of about 10 to about 50 weight percent of the chewing gum;

adding a chewing gum bulk portion to the running mixer in an amount of about 90 to about 50 weight percent of the chewing gum;

dispersing the licorice powder in the glycerin;

adding the licorice powder and the glycerin to the running mixer; and mixing the components together to form chewing gum.

2. The method of claim 1, wherein the licorice powder and glycerin are provided in a ratio of about 20-50 parts by weight licorice powder to about 80-50 parts by weight glycerin.

3. A chewing gum prepared according to the method of claim 1.

4. A method of preparing a chewing composition which includes a licorice flavor ingredient, comprising the steps of:

pre-blending quantities of licorice powder and glycerin, in a ratio of about 5-60 parts by weight licorice powder to about 95-40 parts by weight glycerin, until the licorice powder is uniformly dispersed in the glycerin;

adding a chewing gum base to a running mixer in an amount of about 10 to about 50 weight percent of the chewing gum;

adding a chewing gum bulk portion to the running mixer in an amount of about 90 to about 50 weight percent of the chewing gum;

adding the blend of licorice powder and glycerin to the running mixer; and mixing the components together to form chewing gum.

5. The method of claim 4, wherein the licorice powder and glycerin are pre-blended in a ratio of about 20-50 parts by weight licorice powder to about 80-50 parts by weight glycerin.

6. A chewing gum prepared according to the method of claim 4.

7. A method of preparing a chewing gum composition which includes a licorice flavor ingredient, comprising the steps of:

providing quantities of licorice powder and glycerin, in a ratio of about 5-60 parts by weight licorice powder to about 95-40 parts by weight glycerin;

adding a chewing gum base to a running mixer in an amount of about 10 to about 50 weight percent of the chewing gum;

sequentially adding parts of a bulk portion to the running mixer in amounts totalling about 90 to about 50 weight percent of the chewing gum;

sequentially adding the glycerin immediately followed by the licorice powder, to the running mixer, after at last one part of the bulk portion has been added, such that the licorice powder becomes dispersed within the glycerin; and mixing the components together to form chewing gum.

8. The method of claim 7, wherein no chewing gum ingredients other than licorice powder are added to the chewing gum composition immediately before or after, or at the same time, as the glycerin.

9. The method of claim 7, wherein the licorice powder and glycerin are provided in a ratio of about 20-50 parts by weight licorice powder to about 80-50 parts by weight glycerin.

10. A chewing gum prepared according to the method of claim 7.

* * * * *

UNITED STATES PATENT AND TRADEMARK OFFICE
CERTIFICATE OF CORRECTION

PATENT NO. : 5,156,865
DATED : October 20, 1992
INVENTOR(S) : Victor V. Gudas et al.

It is certified that error appears in the above-indentified patent and that said Letters Patent is hereby corrected as shown below:

Column 8, lines 31,
    In claim 7, line 15, delete "last" and substitute therefor --least--.

Signed and Sealed this

Eighteenth Day of October, 1994

Attest:

BRUCE LEHMAN

*Attesting Officer*      *Commissioner of Patents and Trademarks*